United States Patent [19]

Schreiber et al.

[11] 4,009,381
[45] Feb. 22, 1977

[54] ILLUMINATED FIBER OPTIC JEWELRY

[76] Inventors: Sally Ann Schreiber, 4 Speridakas Terrace, Cambridge, Mass. 02139; Thomas Walley Williams, III, 71 Orchard St., Belmont, Mass. 02178

[22] Filed: Sept. 12, 1974

[21] Appl. No.: 505,575

[52] U.S. Cl. .......................... 240/1 EL; 240/6.4 W; 240/10 R; 240/10.6 R; 350/96 R
[51] Int. Cl.[2] .................... F21V 33/00; G02B 5/14
[58] Field of Search ............... 240/6.4 W, 1 EL, 10, 240/10.5, 10.6; 350/96 R, 96 B

[56] References Cited
UNITED STATES PATENTS

| | | | |
|---|---|---|---|
| 2,316,589 | 4/1943 | Iwanowicz | 240/10 |
| 2,507,909 | 5/1950 | Kaysen | 240/1 EL |
| 2,931,739 | 4/1960 | Marzocchi et al. | 350/96 B X |
| 3,018,362 | 1/1962 | Joyce | 240/1 EL X |
| 3,158,432 | 11/1964 | Arend et al. | 350/96 B X |
| 3,175,481 | 3/1965 | Lahr | 350/96 B X |
| 3,347,649 | 10/1967 | Singer, Jr. | 350/96 B X |
| 3,727,044 | 4/1973 | Monroy | 240/1 LP |
| 3,803,398 | 4/1974 | Walker | 350/96 B |
| 3,805,047 | 4/1974 | Dockstader | 240/6.4 W |
| 3,866,035 | 2/1975 | Richey, Jr. | 240/6.4 W |

*Primary Examiner*—Richard A. Wintercorn
*Attorney, Agent, or Firm*—Kenway & Jenney

[57] ABSTRACT

An article of illuminated jewelry has a substantially planar, radial array of fiber optic filaments organized around a common light source and secured at an end proximate the light source by an annular plastic matrix. In a preferred form, the matrix is an epoxy resin ring and the free ends of the optical fibers are angled up to direct the transmitted light away from a person wearing the jewelry and towards a viewer. The free fiber ends can extend beyond the edge of a decorative body or shield of the jewelry, or project through apertures formed therein. The tips preferably form a decorative pattern or otherwise contribute to the aesthetic appeal of the piece of jewelry. In one form, two or more arrays ar stacked to increase the density of the light emitting fibers. A self-contained battery and switch arrangement power and control the light source.

7 Claims, 10 Drawing Figures

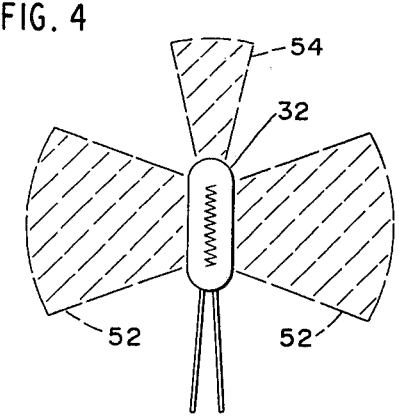
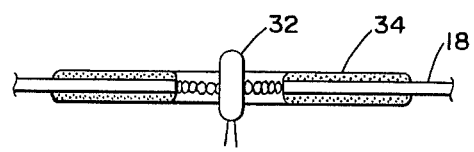
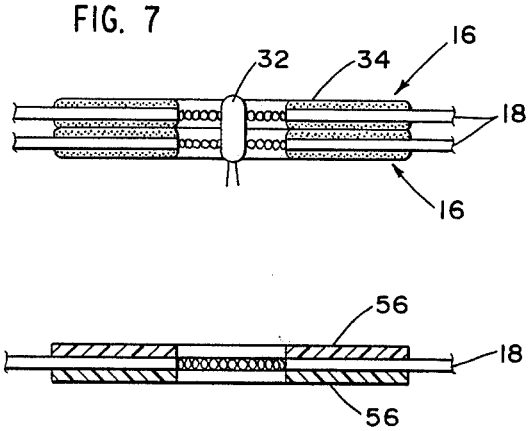
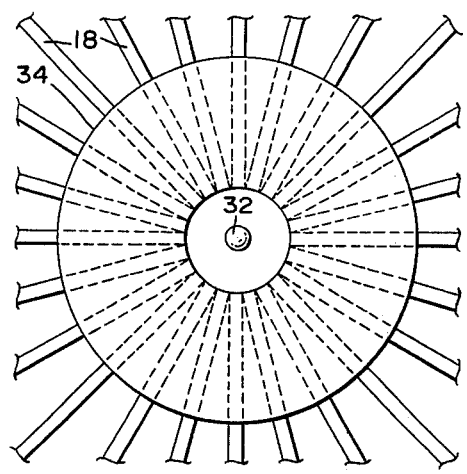
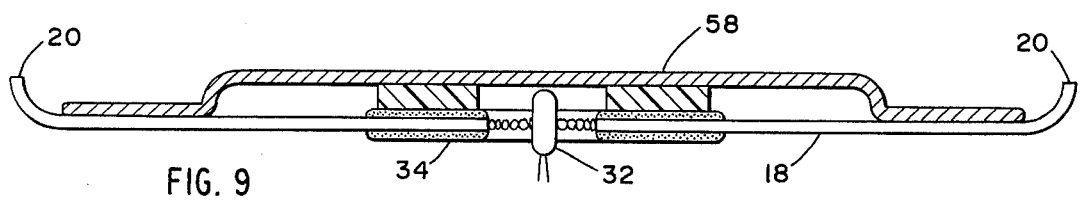
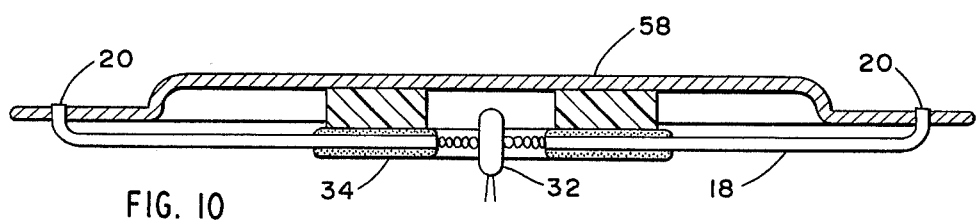

ILLUMINATED FIBER OPTIC JEWELRY

BACKGROUND OF THE INVENTION

This invention relates in general to jewelry, and more specifically to articles of jewelry utilizing illuminated fiber optics.

In the manufacture of articles of jewelry, it is well known to enhance the appearance of an article such as a pin, brooch or pendant by means of a self-contained light source powered by a battery, also self-contained. U.S. Pat. No. 3,854,563 to Catching and U.S. Pat. No. 3,384,740 to Wood are representative of this type of jewelry. In recent years, the light conducting characteristics of fiber optics have been used in the construction of jewelry and ornamental displays. U.S. Pat. No. 3,431,410 to Dolan et al and U.S. Pat. No. 3,624,384 to Wall are representative of such jewelry and displays. These and other conventional ornamental fiber optics typically use an aligned bundle of fibers that each have one bundled end located next to a light source to receive the light and a free end in either a random, "weeping willow" array or a fixed pattern.

This arrangement of the fibers has serious disadvantages when used in jewelry. First, the bundled arrays are poor receptors of the light emitted from a standard light source such as a small, incandescent light bulb. The bulb radiates light in all directions, but the bundled end receives only the relatively small fraction of the total radiation, typically the light emitted from one end of the bulb. Besides this poor light utilization, this arrangement also limits the number of fibers which can be effectively illuminated and distributes the available light unevenly over the bundle, with the central region of the bundle typically receiving a much more intense illumination than the peripheral fibers. These problems are usually compensated to some extent by using larger bulbs which require larger and heavier batteries.

In addition to these light reception and weight problems, the conventional bundled fiber optics are also ill adapted to use in jewelry because the free, light emitting ends do not direct the light towards a viewer facing the person wearing the jewelry. The droopy array described in Dolan, for example, directs the light downwardly in the general direction of the floor.

It is therefore a principal object of this invention to provide a fiber optic array that is constructed to illuminate a relatively flat, compact, light weight article of jewelry, with the illumination emitted by the fibers being readily viewed by a person facing the wearer and contributing to the overall aesthetic appeal of the article.

Another object is to provide a fiber optic array that is readily adapted to a wide variety of jewelry designs, provides a predetermined pattern of light emitting fiber ends and offers a high density of uniformly illuminated fibers.

Still another object of the invention is to provide a fiber optic array that is easily manufactured at a relatively low cost.

SUMMARY OF THE INVENTION

Illuminated articles of jewelry constructed according to the invention employ a substantially planar, radial array of fiber optics each having one end proximate a common central light source and secured in an annular plastic matrix. The free ends of the fibers are preferably angled up from the plane of the array to direct the conducted light towards a person viewing the article. The angled tips themselves preferably form an aesthetically pleasing, pre-selected pattern. A self-contained battery controlled by a suitable switch mechanism powers the light source. The fibers are positioned about the light source to achieve a highly efficient utilization of the available light. In one form, multiple stacked arrays provide an extremely high fiber density. In a preferred form, the article of jewelry has a decorative shield with the fiber ends either projecting beyond the edge of the shield or penetrating the shield through suitable holes.

These and other features and objects of this invention will be more fully understood from the following detailed description of the invention to be read in conjunction with the accompanying drawings.

BRIEF DESCRIPTION OF THE DRAWINGS

FIG. 4 is a side elevational view of the light source shown in FIGS. 2 and 3 showing its pattern of light distribution;

FIG. 5 is a detailed view of the radial fiber optic array shown in FIG. 3 which is adapted to most effectively utilize the light distribution pattern illustrated in FIG. 4;

FIG. 6 is a plan view of the array shown in FIG. 5;

FIG. 7 is a view corresponding to FIG. 5 which illustrates an alternative embodiment of the invention utilizing multiple stacked fiber optic arrays;

FIG. 8 is a view corresponding to FIG. 5 which illustrates an alternative embodiment of the invention utilizing a sandwich of plastic layers to secure the fiber optics;

FIG. 9 is a sectional view showing the fiber optic array extending beyond a decorative shield;

FIG. 10 is a view corresponding to FIG. 9 showing the emitting tips of the fibers passing through the decorative shield.

DETAILED DESCRIPTION OF THE PREFERRED EMBODIMENTS

Figure 1:
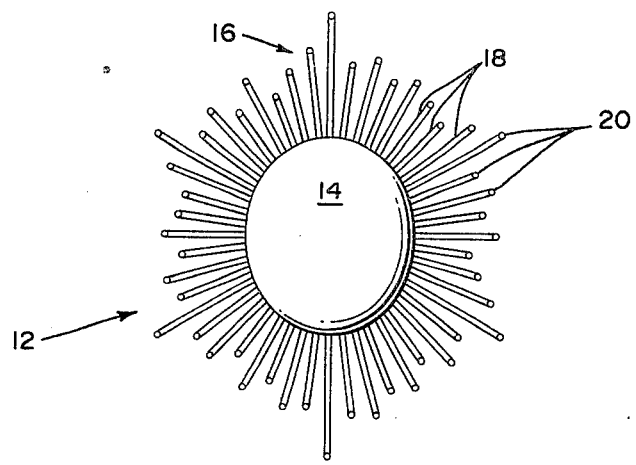
FIG. 1 is a top plan view of an illuminated pin constructed according to the invention.

FIG. 1 shows a pin 12 having a central decorative dome 14 and an array 16 of optical fibers 18 projecting radially from under the dome. The outer tip 20 of each fiber 18 is angled to face away from the person wearing the pin 12 and emit the light carried by the fibers towards a person facing the wearer. The tips 20 are themselves arranged in a pleasing decorative pattern through a proper selection of the length of each fiber 18.

Figure 2:
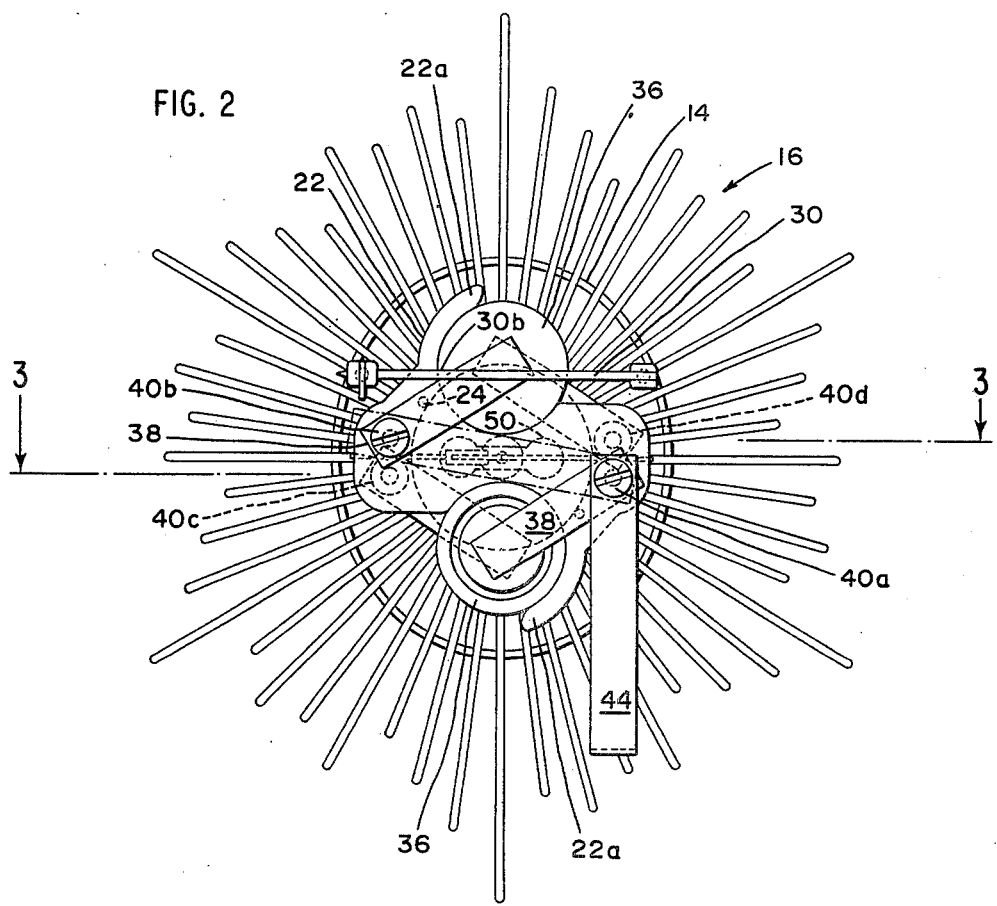
FIG. 2 is an enlarged bottom plan view of the pin shown in FIG. 1 with the switch mechanism in the open position.
Figure 3:
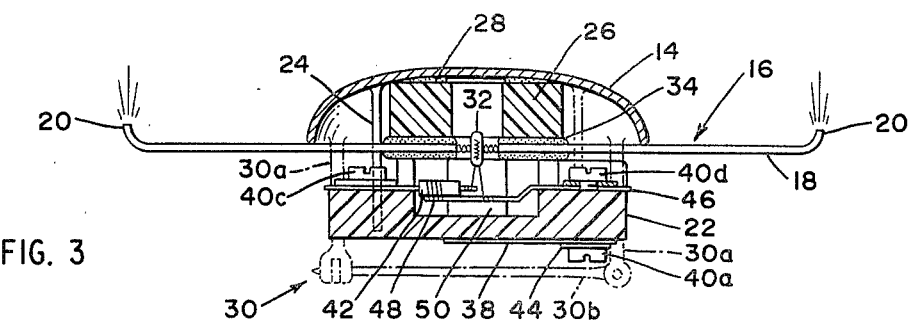
FIG. 3 is a sectional view taken along the line 3—3 of FIG. 2.

With reference to FIGS. 2 and 3, the pin 12 has a plastic battery holder 22 mounted under the dome 14 by pins 24 secured to the holder by a friction fit. The fiber optics array 16 is supported between the holder and a washer 26. An adhesive layer 28 bonds the dome 14 to the washer 26. The pin 12 is secured to a garment by a conventional clasp 30 having a pair of upstanding leg portions 30a secured to the dome 14 and a pin 30b pivotally connected to one of the legs 30a and replaceably secured to the other leg 30a.

A small incandescent light bulb 32 is positioned at the center of the array 16 with its longitudinal axis oriented transversely to the plane of the array 16. The bulb 32 should be compact and have relatively low power requirements while providing a sufficient light flux to adequately illuminate all of the fibers 18 in the array. The fibers 18 are radially aligned with respect to the bulb 32 and the array 16 lies substantially in a single plane. This configuration is secured by an annular matrix 34 that grips and fixes the end of each fiber 18 that is proximate the light source 32. It should be noted that the thickness of the relatively thin layer 34 shown in the drawings is greatly exaggerated. Preferably the matrix material is an epoxy resin such as the all-purpose epoxy cement produced by Union Laboratories, Inc. under the trade designation Boxer. The fibers 18 preferably have a diameter in the range of 5 to 40 mils and are of the type manufactured by the Dupont Co. under the trade designation Crofon Optical Fibers. A suitable lightbulb 32 is manufactured by the Pinlights, Inc. lites Division of REFAC under the trade designation Micro-Miniature Lamp No. 15-15. Another suitable lightbulb, having a somewhat different light distribution pattern, is manufactured by Pinlites under the trade designation Microminiature Lamp No. L-12-12. Although the lamp described above is an incandescent light bulb, it will be understood that a suitable light-emitting diode may also be employed. Since the lamp may have a non-circular geometry, it will be understood that the annulus can have a corresponding non-circular hole such as a square.

A pair of small, light-weight batteries 36 held in a pair of generally C-shaped portions 22a of the battery holder 22 power the lightbulb 32. It has been found that conventional 1.4 volt hearing aid batteries offer the desired characteristics of low weight, compactness and long battery life. Conductive strips 38 each having one end secured to the battery holder 22 by screws 40a, 40b, 40c and 40d electrically connect the batteries 36 in series with each other, the bulb 32 and a resistor 42 when a switch strip 44 (shown in an open circuit position in FIG. 2) is pivoted about the screw 40a to contact the screw 40b with its free end and thus close the circuit. Preferably each of the strips 38 and 44 are slightly flexed in order to exert a slight spring pressure at the free end contact point (a battery terminal surface for the members 38 and the screw 40b for the member 44). It should be noted that the screw 40a secures both one of the members 38 and the pivoting switch member 44 as can be most clearly seen in FIG. 3.

With further reference to FIG. 3, the electrical connection between the strip 38 and the resistor 42 and bulb 32 utilizes the resistor leads and a strip of wire 46. One lead of the resistor makes electrical contact with the connector 38 secured by the screw 40c and the other lead connects to a fine wire lead from the bulb 32. The other lead from the bulb 32 is connected to the wire 46 which is in electrical contact with the connectors under the screw 40d. The mechanical stability of the resistor 42 and the bulb 32 is enhanced by securing the body of the resistor 42 to the free end of the wire 46 by wrapping them together with a fine thread or wire 48. The resistor 42 and bulb 32 are housed in a narrow channel 50 formed in the central portion of the holder 22 intermediate the battery holding portions 22a.

A significant feature of the invention is the radial arrangement of fiber optics about the light bulb 32, secured by an annular plastic matrix, which offers a maximum effective utilization of the light emitted from the bulb 32. FIG. 4 illustrates a typical light emission pattern for a conventional bulb 32. The maximum light transmission occurs in a generally lateral direction through the sides of the bulb as indicated by a field of light 52. A markedly lower level of light energy is emitted through the end of the bulb as indicated by a field of light 54. FIGS. 5 and 6 graphically demonstrate how the substantially planar, radial configuration of fiber optics characteristic of the invention utilizes the emission field 52 to the best advantage. This light utilization is in sharp contrast with that of bundled fiber optic arrays found in the prior art. Also, as is clearly shown in FIG. 6, the light receiving end of each fiber 18 is oriented with respect to the bulb 32 to minimize the angle between the longitudinal axis of the fiber and the light source. Since the amount of light received by a fiber is highly dependant on this angle of incidence, the radial configuration of the invention minimizes the angle of incidence and therefore promotes the effective utilization of the available light.

FIGS. 7-10 illustrate alternative embodiments of the invention. FIG. 7 shows a pair of arrays 16 stacked together about a common light source 32 to double the available number of fibers and utilize even more of the emitted light. Although two arrays are shown, it will be understood that more than two arrays can be used as long as the fiber ends of each array proximate the light source receive sufficient illumination. Also, although the arrays are shown as separated by a portion of the adhesive layer 34, it will be understood that this layer is extremely thin, so that the fibers of one layer may even nest in the spaces between the fibers of another layer. This embodiment provides an extremely high fiber density and efficient utilization of the available light.

FIG. 8 illustrates the use of a pair of plastic rings 56 to sandwich and thus secure the fiber ends proximate the light source. The rings 56 can be mechanically urged toward one another to clamp the interposed fibers 18 or they can be bonded with a suitable adhesive. If an adhesive is employed, it is possible to totally eliminate one of the rings 56. FIGS. 9 and 10 illustrate an article of jewelry having a decorative shield or body portion 58 rather than the dome 14. The shield 58 can itself bear a decorative design or it can serve as a mounting surface for other ornamental elements. The fibers 18 emit a pattern of light towards the viewer from the angled tips 20 which either project beyond the edge of the shield (FIG. 9) or project through suitable apertures formed in the body of the shield 58 (FIG. 10). In either event, the location of the light emitting tips 20 can be preselected to form an aesthetically pleasing pattern that compliments the decorative design of the shield 58.

Although various alternative embodiments and constructions have been described hereinabove, these and various other modifications of the invention will become apparent to those skilled in the art from the foregoing description and accompanying drawings. Such modifications are intended to fall within the scope of the appended claims.

Having thus described the invention, what is claimed is:

1. A relatively flat, compact article of jewelry to be worn by a person comprising,
   a battery holder operable to secure low voltage battery means,
   an apertured, relatively thin matrix mounted generally adjacent said battery holder and having an aperture axis, a plurality of individual, elongated, filamentary light-conducting fibers having major portions thereof arranged in a primarily planar array, said fibers having their converging inner ends embedded in said matrix and directed generally toward a central axis of said apertured matrix and their outer tips arranged to form a decorative pattern of dispersed small points of light and each of said fibers having a diameter in the range of 5 to 40 mils and being operable to minimize the loss of light conducted by the fibers through the sides of the fibers, a lamp disposed at said axis of said matrix aperture generally adjacent the converging inner ends of said fibers to maximize the transmission of light from said lamp to the inner ends of said fibers, a switch, means for electrically connecting said battery means, said lamp and said switch, means for supporting said article of jewelry on said person, and a decorative shield overlying said lamp and said matrix.

2. An article of jewelry according to claim 1 wherein said outer tips are angled in a direction generally transverse to the plane of said array and the lengths of said tips are substantially less than the lengths of said major portions of said fibers disposed in said primarily planar array.

3. An article of jewelry according to claim 2 comprising at least one additional primarily planar array of said fibers superposed on one another.

4. An article of jewelry according to claim 2 further comprising spacer means engaging said shield and presenting a planar support surface to said matrix.

5. An article of jewelry according to claim 2 in which said decorative shield is opaque and conceals said lamp and said matrix.

6. An article of jewelry according to claim 5 in which said decorative shield conceals said fibers except for said outer tips which are located in holes formed in said shield.

7. An article of jewelry according to claim 5 in which said decorative shield conceals said fibers except for said outer tips and an adjacent part of said major portion of said fibers.

* * * * *